United States Patent
Hirai (10) Patent No.: US 7,474,505 B2
(45) Date of Patent: *Jan. 6, 2009

(54) MAGNETIC TAPE MEDIUM

(75) Inventor: Noriyuki Hirai, Miyagi (JP)

(73) Assignee: Sony Corporation, Tokyo (JP)

( * ) Notice: Subject to any disclaimer, the term of this patent is extended or adjusted under 35 U.S.C. 154(b) by 486 days.

This patent is subject to a terminal disclaimer.

(21) Appl. No.: 11/256,792

(22) Filed: Oct. 24, 2005

(65) Prior Publication Data

US 2006/0087767 A1    Apr. 27, 2006

(30) Foreign Application Priority Data

Oct. 27, 2004    (JP)    ............................ P2004-312293

(51) Int. Cl.
  *G11B 23/00*    (2006.01)
  *G11B 5/716*    (2006.01)
(52) U.S. Cl. ...................... 360/134; 428/840.1; 428/845
(58) Field of Classification Search ................. 428/840, 428/840.1, 845, 332, 838, 845.5, 845.6, 900, 428/847, 847.1; 360/93, 32, 27, 131, 12, 360/134

See application file for complete search history.

(56) References Cited

U.S. PATENT DOCUMENTS

| | | | | |
|---|---|---|---|---|
| 6,103,365 A | * | 8/2000 | Ishii et al. ................... | 428/332 |
| 7,341,798 B2 | * | 3/2008 | Hirai ........................ | 428/840.1 |
| 2003/0054204 A1 | * | 3/2003 | Kasuga et al. ............... | 428/840 |
| 2003/0203240 A1 | * | 10/2003 | Seng et al. .................. | 428/840 |
| 2004/0151948 A1 | * | 8/2004 | Tei et al. ..................... | 428/840 |
| 2005/0105210 A1 | * | 5/2005 | Okawa et al. ................. | 360/93 |

* cited by examiner

*Primary Examiner*—Carol Chaney
*Assistant Examiner*—Louis Falasco
(74) *Attorney, Agent, or Firm*—Sonnenschein Nath & Rosenthal LLP

(57) ABSTRACT

A magnetic tape medium having superior dimensional stability in the width direction and off-track resistance is provided although having a very high track width in the width direction. As a non-magnetic substrate of a magnetic tape medium in which the track density in the width direction is 50 tracks/mm or more, the off-track margin is 5 μm or less, and the maximum permissible amount of change in dimension in the width direction caused by environment factors is 0.10% or less, a laminate composed of a plastic film and films provided on two surfaces thereof is used, the films being formed of a material selected from the group including a metal, a semi-metal, an alloy, and an oxide or composite formed of the aforementioned material, having a Young's modulus of $7 \times 10^3$ kg/mm$^2$ or more and a coefficient of thermal expansion of $18 \times 10^{-6}$/° C. or less.

4 Claims, 1 Drawing Sheet

FIGURE

MAGNETIC TAPE MEDIUM

CROSS REFERENCES TO RELATED APPLICATIONS

The present invention contains subject matter related to Japanese Patent Application JP 2004-312293 filed in the Japanese Patent Office on Oct. 27, 2004, the entire contents of which are incorporated herein by reference.

BACKGROUND OF THE INVENTION

1. Field of the Invention

The present invention relates to a magnetic tape medium on which recording and reproducing are performed in the longitudinal direction, and more particularly, relates to a magnetic tape medium having superior dimensional stability in the width direction and superior off-track resistance.

2. Description of the Related Art

In recent years, the amount of information has been explosively increasing because of the spread of the Internet, digital recording, and the like, and recording media for recording information as backup data have been developed toward higher capacity and higher recording density. A recording tape medium, which is wound and is placed in a cartridge, for recording backup data has been used in a commercially available linear recording system in which, in order to achieve a higher recording capacity, recording and reproducing are performed on a tape in the longitudinal direction thereof using a fixed head composed of many magnetoresistive heads. In order to further increase a recording capacity, various methods have also been attempted: short-wavelength recording is performed by decreasing the thickness of a magnetic recording layer, the track density in the tape width direction is increased, and the thickness of a tape is decreased so that the length per one reel is increased. In addition, for example, by disposing many heads or increasing a relative speed between a tape and a head, increase in transfer speed of data has also been performed.

Among the methods described above, when the short-wavelength recording is performed by decreasing the thickness of a magnetic recording layer, due to a small spacing between the magnetic recording layer and the head, problems may arise in that the output decreases, running durability degrades when the magnetic recording layer is allowed to run many times, and the like; hence, various types of research have been carried out. In addition, when the track density in the tape width direction is increased, due to the change in position of the tape in the width direction during high speed running and/or the change in dimension of the tape itself caused by environmental factors, a so-called off-track phenomenon may occur in which the track is not present at a predetermined tape position which is to be read by a magnetic head, or the position of the track is shifted. In particular, when a thin film medium is used, since running properties become unstable and the change in dimension of the tape itself caused by environment factors is increased, the problem described above becomes more serious. In order to avoid this off-track phenomenon, a method has been proposed in which a servo signal is recorded on a tape so that tracking is properly performed. As this servo signal recording method, for example, there is known a method in which a magnetic or an optical servo signal is recorded on a tape magnetic layer side or a back layer side.

As for the change in position of a tape in the width direction during operation, the change being one factor causing the off-track phenomenon in the tape width direction, a method has been proposed in which undulation of a tape edge is suppressed (for example, see Japanese Unexamined Patent Application Publication No. 2003-132526). In addition, as a method for suppressing another change, that is, the change in dimension of the tape itself which is caused by environment factors, for example, a method has been proposed in which the coefficients of thermal and hygroscopic expansion of a tape or a non-magnetic substrate are decreased (for example, see Japanese Unexamined Patent Application Publication No. 11-250449). However, when the track density in the width direction is relatively low, and a permissible off-track amount (=((recording track width)−(reproducing track width))/2, hereinafter referred to as "off-track margin") is sufficiently large, practically, the problem is not serious in the actual environment, and the same thing can also be said when the change in position of the tape in the width direction during running is relatively large.

SUMMARY OF THE INVENTION

However, when the track density in the tape width direction is very high, such as 50 tracks/mm or more, the off-track margin is 5 μm or less, and the maximum permissible amount of change in dimension of the tape itself in the width direction is small, such as 0.10% or less, the amount of change being caused by environment factors such as the change in temperature and humidity, the change in tension, and the creep, it was found that the off-track phenomenon is liable to occur.

That is, when the track density in the width direction is increased, and the track width is decreased, even when the rate of change in position of the tape in the width direction is not so much changed, the maximum permissible amount of change in dimension of the tape itself in the width direction is further decreased, the amount of change being caused by the environment factors such as the change in temperature and humidity, the change in tension, and the creep. In addition, since the tape medium as described above is not always used in the same recording and reproducing device (hereinafter referred to as a "drive") and may be used for recording and reproducing in several different drives in some cases, the gaps between magnetic heads of the drives are slightly different from each other, and this slight difference in gap is also preferably taken into account as a part of the off-track margin. In the situations described above, even a very slight change in dimension of the tape in the width direction may unfavorably tend to cause the decrease in reproduction output and/or the generation of the off-track phenomenon.

The present invention was made to solve the problems described above, and it is desirable to have a magnetic tape medium that ensures stable recording and reproducing properties and that rarely has an off-track problem even when the track density in the tape width direction is very high, such as 50 tracks/mm or more, the off-track margin is 5 μm or less, and the maximum permissible amount of change in dimension of the tape itself in the width direction is small, such as 0.10% or less, the amount of change being caused by the environment factors such as the change in temperature and humidity, the change in tension, and the creep.

That is, a magnetic tape medium having a thickness of 3.0 to 9.5 μm, according to an embodiment of the present invention, includes: a non-magnetic substrate; a least one magnetic layer having a thickness of 0.3 μm or less on one surface of the non-magnetic substrate, formed by applying a magnetic dispersion composed of a binder and a ferromagnetic powder dispersed therein; and a back layer on another surface of the non-magnetic substrate, formed by applying a dispersion composed of a binder and an inorganic pigment dispersed therein, in which a servo signal is recorded on at least one of the magnetic layer and the back layer for tracking control, the track density in the tape width direction is 50 tracks/mm or more, the off-track margin is 5 μm or less which is represented by one half of the difference between the recording track width and the reproducing track width, and the maximum permissible amount of change in dimension of the tape itself in the width direction caused by the environment factors is 0.10% or less. In the magnetic tape medium described above, the non-magnetic substrate includes a plastic film and films provided on two surfaces thereof, the films each being formed of a material selected from the group including a metal, a semi-metal, an alloy, an oxide, and a composite, the material having a Young's modulus of $7\times10^3$ kg/mm$^2$ or more and a coefficient of thermal expansion of $18\times10^{-6}$/° C. or less, the oxide and the composite each being formed from one of the metal, the semi-metal, and the alloy.

According to an embodiment of the present invention, by the films which are formed on the two surfaces of the plastic film forming the non-magnetic substrate and which are each composed of a material having a Young's modulus of $7\times10^3$ kg/mm$^2$ or more and a coefficient of thermal expansion of $18\times10^{-6}$/° C. or less, the change in dimension of the non-magnetic substrate in the width direction can be effectively suppressed which is caused by the environmental factors such as the change in temperature and humidity, the change in tension, and the creep, and as a result, even when the track density in the width direction is very high, and the maximum permissible amount of change in dimension of the tape itself is small, a magnetic tape medium rarely having an off-track problem and having stable recording and reproducing properties can be obtained.

In addition, since the films formed of a material having a Young's modulus of $7\times10^3$ kg/mm$^2$ or more and a coefficient of thermal expansion of $18\times10^{-6}$/° C. or less are provided, a plastic film having a Young's modulus of 500 kg/mm$^2$ or more in the longitudinal direction and a Young's modulus of 400 kg/mm$^2$ or more in the width direction can be used for forming the non-magnetic substrate.

In addition, in order to obtain the above effects, the films each formed of the material described above preferably have a thickness of 10 nm or more.

According to the embodiment of the present invention, as the non-magnetic substrate, since the films each formed of a material selected from the group including a metal, a semi-metal, an alloy, an oxide, and a composite are provided on the two surface of the plastic film, the oxide and the composite each being formed from one of the aforementioned materials, the material having a Young's modulus of $7\times10^3$ kg/mm$^2$ or more and a coefficient of thermal expansion of $18\times10^{-6}$/° C. or less, even when the track density in the width direction is very high, the change in dimension of the tape in the width direction caused by the environment factors can be suppressed, and as a result, a magnetic tape medium rarely having an off-track problem and having stable recording and reproducing properties can be obtained.

DESCRIPTION OF THE PREFERRED EMBODIMENTS

Hereinafter, a preferred embodiment according to the present invention will be described.

Figure 1:
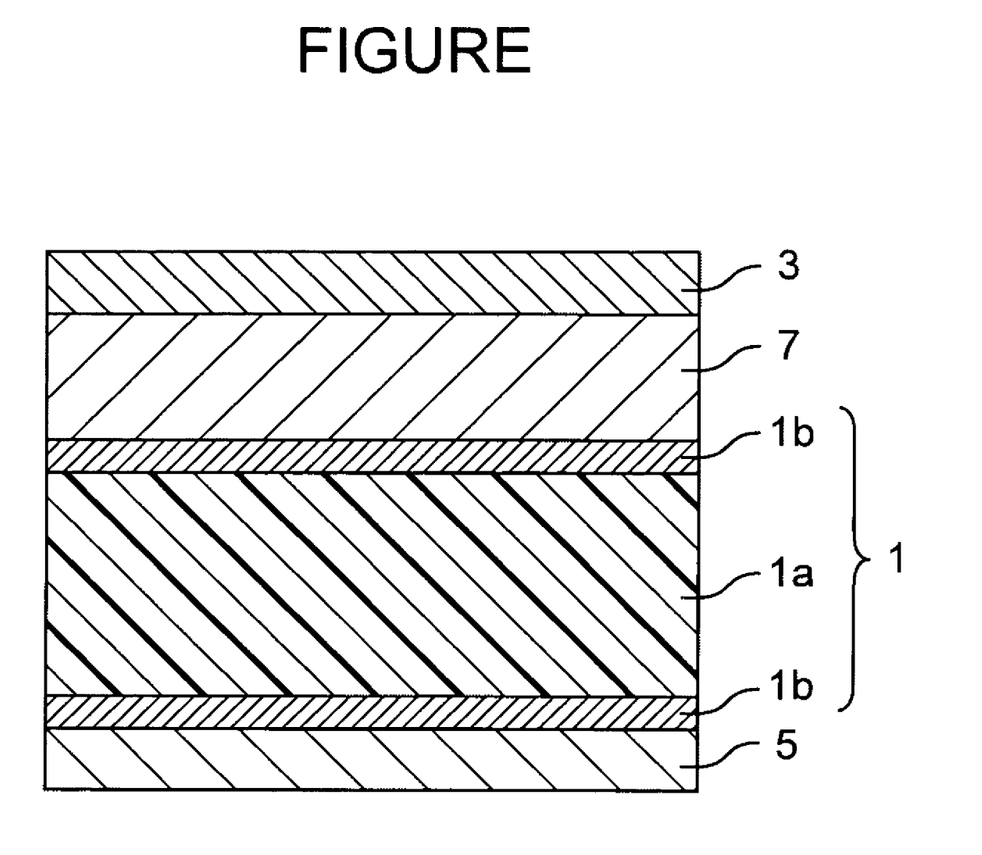
FIG. 1 is a cross-sectional view showing a magnetic tape medium according to an embodiment of the present invention.

FIG. 1 is a cross-sectional view showing a magnetic tape medium according to an embodiment of the present invention. In the magnetic tape medium according to this embodiment, the track density in the tape width direction is 50 tracks/mm or more, an off-track margin A (A=((recording track width)−(reproducing track width))/2) is 5 μm or less, and the maximum permissible amount of change in dimension of the tape in the width direction caused by environment factors is 0.10% or less, the environment factors being such as the change in temperature and humidity, the change in tension, and the creep. As shown in FIG. 1, in the magnetic tape medium described above, a non-magnetic substrate 1 includes a plastic film 1$a$ and films 1$b$ provided on two surfaces thereof, the films 1$b$ each being formed of a material selected from the group including a metal, a semi-metal, an alloy, an oxide, and a composite, the oxide and the composite each being formed from one of the aforementioned materials, the material having a Young's modulus of $7\times10^3$ kg/mm$^2$ or more and a coefficient of thermal expansion of $18\times10^{-6}$/° C. or less. In addition, on one surface of this non-magnetic substrate 1, a magnetic layer 3 having a thickness of 0.3 μm or less is provided which is formed by applying a magnetic dispersion composed of a binder and a ferromagnetic powder dispersed therein, and on another surface of the non-magnetic substrate 1, a back layer 5 is provided which is formed by applying a dispersion composed of a binder and an inorganic pigment dispersed therein. In addition, a servo signal is magnetically or optically recorded on at least one of the magnetic layer 3 and the back layer 5 for tracking control.

The magnetic tape medium described above is formed to have a thickness of 3.0 to 9.5 μm. When the thickness of the magnetic tape medium is less than 3.0 μm, running of the tape medium becomes unstable since the change in position of the tape medium in the width direction is increased during drive operation. In addition to the above problem, the amount of change in dimension of the tape medium in the width direction is considerably increased due to an effect of the Poisson's ratio which is caused when a tension is applied in the longitudinal direction, and the amount of change in creep is also considerably increased when a tension is being applied in the longitudinal direction for a long period of time. Furthermore, when the thickness of the magnetic tape medium is more than 9.5 μm, the tape length to be wound per one cartridge is decreased, and as a result, a higher capacity itself may not be achieved.

In this embodiment, as the plastic film 1$a$ for forming the non-magnetic substrate 1, for example, there may be mentioned poly(ethylene terephthalate), poly(ethylene naphthalate), poly(tetramethylene terephthalate), poly(1,4-cyclohexylenedimethylene terephthalate), poly(ethylene-p-oxybenzoate), polyimide, and polyamide. Among those mentioned above, polyester plastics such as poly(ethylene terephthalate) and poly(ethylene naphthalate) are particularly preferable in terms of high productivity and relatively inexpensive price.

In addition, this film may have a single layer structure or a multilayer structure, and in order to improve adhesion, surface treatment such as corona discharge treatment, electron beam irradiation treatment, or formation of easy-adhesion layer may be performed for the surface of the film, and/or in order to decrease the coefficient of hygroscopic expansion, water repellent treatment may be performed for the surface of the film.

In addition, for example, in order to control the surface properties and to obtain the running stability, organic or inorganic filler such as calcium carbonate, silica, aluminum oxide, or polystyrene may also be contained in the film. As a surface roughness Ra, a surface to be provided with the magnetic layer by application preferably has 0.5 to 8 nm and particularly preferably 0.5 to 6 nm. When the surface roughness is less than 0.5 nm, the friction with a guide roll is extremely increased during tape production, and as a result, the running becomes unfavorably unstable. On the other hand, when the surface roughness is more than 8 nm, the surface roughness of the tape is increased after the magnetic layer is provided by application, and a spacing loss with regard to a head is unfavorably increased. In addition, the surface roughness Ra of a surface to be provided with the back layer by application is preferably 4 to 25 nm and particularly preferably 5 to 15 nm. When the surface roughness is less than 4 nm, as is the case of the surface to be provided with the magnetic layer, the running becomes unfavorably unstable during production. On the other hand, when the surface roughness is more than 25 nm, the roughness of the tape is increased after the back layer is provided by application, and in the case in which the film is stored in a wound state during production or is stored in a wound state in a cartridge, the roughness of the back layer is transferred to the magnetic layer, so that the roughness of the magnetic layer thus increased undesirably causes a spacing loss.

As the thickness of the plastic film 1a, 2.0 to 8.0 μm is preferable, and 3.0 to 6.0 μm is particularly preferable. When the thickness of the film is less than 2.0 μm, the formation of the film becomes difficult, and in addition to that, the strength is considerably decreased to cause degradation of running durability, the change in dimension of the film in the width direction is increased by the change in tension applied in the longitudinal direction, and/or the creep properties are degraded. On the other hand, when the thickness is more than 8.0 μm, the thickness of the magnetic tape itself is increased, the tape length to be wound per one cartridge is decreased, and as a result, the increase in capacity is inhibited.

As the Young's modulus of the plastic film 1a in the longitudinal direction, 500 kg/mm$^2$ or more is preferable, and 600 kg/mm$^2$ or more is particularly preferable. When the Young's modulus is less than 500 kg/mm$^2$, the strength of the magnetic tape itself is decreased, and for example, the running durability by repeated running may be disadvantageously degraded. In addition, as the Young's modulus of the plastic film 1a in the width direction, 400 kg/mm$^2$ or more is preferable, 600 kg/mm$^2$ or more is particularly preferable, and 650 kg/mm$^2$ or more is even more preferable. When the Young's modulus is less than 400 kg/mm$^2$, for example, the coefficients of thermal and hygroscopic expansion of the magnetic tape itself may be disadvantageously increased.

Furthermore, as a material for the films 1b provided on the two surfaces of the plastic film 1a, for example, a metal such as Cu, Ni, or Ti, an alloy such as Cu—Zn, or an oxide such as $Al_2O_3$, $SiO_2$, or $TiO_2$, may be used as long as it has a Young's modulus of $7 \times 10^3$ kg/mm$^2$ or more and a coefficient of thermal expansion of $18 \times 10^{-6}$/° C. or less. In addition, the film 1b composed of the above material may be formed by a known method such as sputtering, vacuum deposition, or ion plating. The oxide may be formed, for example, by introducing a predetermined oxygen gas during film formation.

The thicknesses of the films 1b provided on the two surfaces of the plastic film 1a are preferably 10 nm or more. When the film thickness is less than 10 nm, due to the irregularities of the plastic film 1a, the plastic film 1a may not be totally covered with the film 1b, and moisture may easily permeate through uncovered portions of the plastic film 1a, so that the coefficient of hygroscopic expansion is increased, or the effect of preventing the swelling of the plastic film 1a is considerably degraded. Furthermore, the film 1b is liable to be peeled away in running during production, and the dropout may disadvantageously occur. In addition, the thickness of the film 1b provided at the back layer side is preferably 0.5 to 1.5 relative to the thickness of the film 1b provided at the magnetic layer side and particularly preferably 0.8 to 1.2. When this value is less than 0.5 or more than 1.5, the curling of the non-magnetic substrate 1 itself considerably occur. As a result, handling may not be well performed during production and/or cupping and curling of the magnetic tape may seriously occur in some cases, and hence the thicknesses of the films are preferably set in the range described above.

In the magnetic tape medium of the embodiment according to the present invention, between the non-magnetic substrate 1 and the magnetic layer 3 and the back layer 5, non-magnetic interlayers 7 composed, for example, of various inorganic powders and a binder, may be provided. In particular, as shown in FIG. 1, the non-magnetic interlayer 7 is preferably provided between the non-magnetic substrate 1 and the magnetic layer 3 so as to have a thickness of 0.2 to 2.5 μm in order to obtain stable application for forming the magnetic layer 3, to enhance the running durability, and the like. When the film thickness is less than 0.2 μm, stable application for forming the magnetic layer may not be easily performed, and when the film thickness is more than 2.5 μm, the thickness of the magnetic tape itself is increased, the tape length to be wound per one cartridge is decreased, and as a result, the increase in capacity is inhibited.

Next, the magnetic layer 3 will be described. As the magnetic layer 3, a film having a thickness of 0.3 μm or less is formed. The reason for this is that when the magnetic layer 3 has a thickness of more than 0.3 μm, short wavelength recording for achieving higher recording density will be inhibited.

As a magnetic powder, binder, dispersant, abrasive material, antistatic agent, antirust agent, lubricant, solvent for preparing a magnetic dispersion, and the like, all materials that have been known may be used and may not be particularly limited at all. As the magnetic powder, for example, there may be mentioned a ferromagnetic iron powder, ferromagnetic iron-cobalt powder, ferromagnetic iron oxide powder, ferromagnetic chromium dioxide powder, ferromagnetic alloy powder, and hexagonal barium ferrite powder.

In addition, as the binder, for example, there may be mentioned vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylic ester-acrylonitrile copolymer, acrylic ester-vinylidene chloride copolymer, methacrylic ester-vinylidene chloride copolymer, methacrylic ester-styrene copolymer, thermoplastic polyurethane resin, phenoxy resin, poly(vinyl fluoride), vinylidene chloride-acrylonitrile copolymer, butadiene-acrylonitrile copolymer, acrylonitrile-butadiene-methacrylic acid copolymer, poly(vinyl butyral), cellulose derivative, styrene-butadiene copolymer, polyester resin, polyamide resin, phenol resin, epoxy resin, thermosetting polyurethane resin, urea resin, melamine resin, alkyd resin, urea-formamide resin, and a mixture thereof. Among those mentioned above, vinyl chloride-based resin and polyurethane resin may be preferably used alone or in combination. In addition, by using an isocyanate compound as a cross-linking agent, the durability may be further improved. Furthermore, the amount of the binder in the magnetic layer is preferably 10 to 50 parts by weight relative to 100 parts by weight of the magnetic powder.

As the abrasive material, for example, alumina, chromium oxide, titanium oxide, calcium carbonate, and silica may be mentioned. The amount of the abrasive material in the magnetic layer is preferably 2 to 40 parts by weight relative to 100 parts by weight of the magnetic powder and more preferably 5 to 30 parts by weight.

As the antistatic agent, for example, carbon black is generally mentioned. Besides the function as the antistatic agent, carbon black is also effective to improve the running durability, and the amount thereof in the magnetic layer is preferably 0.2 to 30 parts by weight relative to 100 parts by weight of the magnetic powder and more preferably 0.5 to 15 parts by weight. The average grain diameter of carbon black widely varies from approximately 5 to 500 nm; however, carbon black materials having an average grain diameter of 5 to 150 nm and more preferably 10 to 100 nm may be used alone or in combination. In particular, known carbon black materials such as acetylene black, furnace black, and thermal black may be used alone or in combination.

As the lubricant, for example, a higher fatty acid such as myristic acid, palmitic acid, stearic acid, oleic acid, or linolic acid, or a fatty acid ester or fatty acid amide formed from the aforementioned fatty acids may be mentioned. Among those mentioned above, the fatty acid, fatty acid ester, and fatty acid amide may be preferably used in combination. The amounts of the fatty acid, fatty acid ester, and fatty acid amide relative to 100 parts of the magnetic powder are preferably set to 0.1 to 3 parts by weight, 0.1 to 3 parts by weight, and 0.1 to 1.5 parts by weight, respectively.

Furthermore, as the solvent for preparing the magnetic dispersion, for example, there may be mentioned a ketone solvent such as acetone, methyl ethyl ketone, methyl isobutyl ketone, or cyclohexanone; an ester solvent such as methyl acetate, ethyl acetate, butyl acetate, ethyl lactate, or glycol acetate monoethyl ester; a glycol ether solvent such as glycol monoethyl ether or dioxane; an aromatic hydrocarbon solvent such as benzene, toluene or xylene; and an organochlorine compounds solvent such as methylene chloride, ethylene chloride, carbon tetrachloride, chloroform, ethylene chlorohydrin or dichlorobenzene.

Next, the non-magnetic interlayer 7 will be described which is formed, for example, for stable application for forming the above magnetic layer 3 and enhancement of the running durability. In this embodiment, in principle, the non-magnetic interlayer 7 is preferably non-magnetic; however, a small amount of a magnetic powder may be contained as long as it has no influence on the magnetic layer 3.

As a non-magnetic inorganic powder and a binder contained in the non-magnetic interlayer 7, as a dispersant, antistatic agent, antirust agent, and lubricant, which are used whenever necessary, and as a solvent for preparing a non-magnetic dispersion, all materials that have been known may be used and may not be particularly limited at all.

As the non-magnetic inorganic powder, for example, there may be mentioned silica, titanium oxide, alumina, carbon black, α-iron oxide, calcium carbonate, and chromium oxide. The forms of the powders mentioned above may not be limited at all; however, in order to decrease the coefficients of thermal and hygroscopic expansion, a plate-shaped or an acicular-shaped inorganic powder is preferable. Among those mentioned above, in order to control the tape toughness and to enhance the running durability, α-iron oxide and alumina are preferably used in combination, and carbon black, which also has an antistatic effect, is more preferably used together therewith.

As the binder, for example, the aforementioned binder for the magnetic layer may also be used. Among those mentioned above, the vinyl chloride-based resin and polyurethane resin are preferably used alone or in combination. In addition, as a cross-linking agent, an isocyanate compound may be used so as to further improve the durability. Furthermore, the amount of the binder in the non-magnetic interlayer is preferably 10 to 50 parts by weight relative to 100 parts by weight of the non-magnetic inorganic powder.

As the lubricant, the aforementioned lubricant for the magnetic layer may also be used. Among those mentioned above, the fatty acid and fatty acid ester are preferably used in combination. The amounts of the fatty acid and fatty acid ester are each preferably set to 0.1 to 3 parts by weight relative to 100 parts by weight of the non-magnetic inorganic powder. As is the case described above, as the solvent for preparing the non-magnetic dispersion, for example, the aforementioned solvents for the magnetic dispersion may also be used.

Next, the back layer 5 will be described. The back layer 5 is preferably formed to have a thickness of 0.1 to 1.5 μm. When the thickness is less than 0.1 μm, the strength of the back layer is not sufficiently increased, and since the strength of the magnetic tape is not increased thereby, in addition to the increase in coefficient of thermal expansion and coefficient of hygroscopic expansion in the width direction, the change in dimension of the tape in the width direction is also increased which is caused by a tension applied in the longitudinal direction; hence, as a result, the amount of change in creep at a load of 1 N is also be increased. On the other hand, when the thickness of the back layer 5 is more than 1.5 μm, the thickness of the magnetic tape itself is increased, and hence the increase in capacity is inhibited.

As an inorganic powder and a binder contained in the back layer 5, as a dispersant and lubricant, which are used whenever necessary, and as a solvent for preparing a back dispersion, all materials that have been known may be used and may not be particularly limited at all. As the inorganic powder, in order to increase the strength of the back layer particularly in the width direction, a plate-shaped or an acicular-shaped inorganic powder is preferably used.

As a plate-shaped inorganic powder, for example, a natural product such as mica or kaolin, or a synthetic product such as barium sulfate or iron oxide may be mentioned. The average grain diameter (in the plate surface direction) of the plate-shaped inorganic powder is preferably 0.15 to 2.0 μm, and the average thickness thereof is preferably 0.005 to 0.1 μm. As the acicular-shaped inorganic powder, for example, an iron oxide may be mentioned. The long axis length of the acicular-shaped inorganic powder is preferably 0.08 to 0.8 μm, and the short axis length thereof is preferably 0.005 to 0.05 μm.

In addition to the plate-shaped or the acicular-shaped inorganic powder, for ensuring antistatic properties, carbon black is preferably added to the back layer 5. The average grain diameter of carbon black widely varies from approximately 5 to 500 nm; however, carbon black materials having an average grain diameter of 5 to 150 nm and more preferably 10 to 100 nm may be used alone or in combination. In particular, known carbon black materials such as acetylene black, furnace black, and thermal black, may be used alone or in combination. Furthermore, for the same purpose as described above, the plate-shaped or the acicular-shaped inorganic powder may be covered with carbon black by surface treatment.

In addition, in order to prevent the change in surface properties of the back layer 5 during repeated running, or particularly, in order to control a signal when a servo signal is optically recorded on the back layer 5, an inorganic powder such as alumina, titanium oxide, calcium carbonate, barium sulfate, or chromium oxide may also be added to the back layer 5.

As the binder, for example, the aforementioned binders for the magnetic layer and the non-magnetic interlayer may be used. Among those mentioned above, the polyurethane resin and the cellulose resin are preferably used in combination. In addition, an isocyanate compound may be used as a cross-linking agent so as to further improve the durability. Furthermore, the amount of the binder in the back layer is preferably 20 to 150 parts by weight relative to 100 parts by weight of the back-layer inorganic powder. As is the case described above, the solvent for preparing the back layer dispersion, for example, the aforementioned solvents for the magnetic dispersion and the non-magnetic dispersion may be used.

The preparation of paints formed, for example, of the above magnetic power and the binder, of the non-magnetic powder and the binder, and of the back-layer inorganic powder and the binder may be performed by methods which have been known in the past, and for example, a sand mill, roll mill, ball mill, kneader, pressure kneader, extruder, homogenizer, disper, and ultrasonic dispersing device may be used. Among those mentioned above, preparation using a kneader or the like for kneading and preparation using a sand mill or the like for dispersing are preferably used in combination.

As a method for applying the magnetic dispersion on the non-magnetic substrate 1, and whenever necessary, applying the non-magnetic dispersion therebetween, for example, a known technique such as blade coating, gravure coating, or die coating may be used. The same thing can be said for the back layer dispersion. Furthermore, either the magnetic layer side or the back layer side of the non-magnetic substrate 1 may be first coated, or both sides thereof may be simultaneously coated.

In addition, in order to decrease the coefficient of hygroscopic expansion, a water repellent effect may be imparted to tape edges. As a method for imparting the water repellent effect, for example, there may be mentioned a method in which a water repellent agent is supplied to a knife of a slitter used in slitting, or a method in which cloth impregnated with a water repellent agent is brought into contact with edges of a tape medium after slitting. As the water repellent agent, for example, an ester compound of perfluoropolyether and carboxylic acid, perfluoroalkyl carboxylate, or fluorine-containing alkyl succinate may be mentioned.

In the magnetic tape medium described above, when the films $1b$ are provided on the two surfaces of the plastic film $1a$ to form the non-magnetic substrate 1, the films $1b$ each being formed of a material selected from the group including a metal, a semi-metal, an alloy, an oxide and a composite, the oxide and the composite being formed from one of the aforementioned materials, permeation of moisture into the plastic film $1a$ forming the most part of the thickness of the magnetic tape can be prevented, the permeation of moisture causing the swelling of the plastic film $1a$. In addition to that described above, even when moisture slightly permeates tape edge portions which are not protected at all and causes the swelling of the plastic film $1a$, the films $1b$ provided on the two surfaces thereof, which are formed of the aforementioned material, prevent the swelling of the non-magnetic substrate, and as a result, the coefficient of hygroscopic expansion in the width direction can be decreased. In the case in which the films as described above are not provided, the tape swells since moisture easily permeates the tape under high humidity conditions, and when the off-track margin is small, and the maximum permissible amount of change in dimension of the tape caused by the environmental factors is small, the off-track phenomenon occurs. Even when the film formed of the aforementioned material is provided on one side surface of the plastic film, moisture easily permeates through the other side surface thereof to cause the swelling of the non-magnetic substrate. In addition to that, curling and cupping of the magnetic tape become serious, and the effect of the formation of the film is hardly observed.

In the non-magnetic substrate 1 described above, the Young's modulus of the film $1b$ formed of the aforementioned material is preferably set to $7\times10^3$ kg/mm$^2$ or more. When the Young's modulus is $7\times10^3$ kg/mm$^2$ or more, the effect of preventing the swelling of the non-magnetic substrate after permeation of moisture becomes significant, and on the other hand, when the Young's modulus is less than $7\times10^3$ kg/mm$^2$, the effect becomes not so significant, and when the off-track margin is small, and the maximum permissible amount of change caused by the environmental factors is small, the off-track phenomenon occurs.

Furthermore, since the film $1b$ formed of the aforementioned material has a Young's modulus of $7\times10^3$ kg/mm$^2$ or more, the amount of change in dimension of the tape in the width direction is decreased which is caused by the effect of the Poisson's ratio obtained when a tension is applied in the longitudinal direction, and in addition, the amount of change in creep in the state in which a tension is being applied in the longitudinal direction for a long time can also be decreased.

In addition, the coefficient of thermal expansion of the film $1b$ formed of the aforementioned material is preferably set to $18\times10^{-6}/°$ C. or less. The reason for this is that although the change in temperature causes the deformation of the plastic film $1a$, when the film $1b$ formed of the aforementioned material has a coefficient of thermal expansion of $18\times10^{-6}/°$ C. or less, the deformation of the non-magnetic substrate 1 can be prevented, and the expansion of the tape in the width direction caused by the change in temperature can be suppressed.

As described above, in this embodiment, since the films formed of the aforementioned material are provided on the two surfaces of the plastic film forming the non-magnetic substrate, and the Young's modulus and the coefficient of thermal expansion of the film formed of the aforementioned material are set to $7\times10^3$ kg/mm$^2$ or more and $18\times10^{-6}/°$ C. or less, respectively, the amount of the change in dimension of the tape itself in the width direction, which is caused by the environmental factors such as the change in temperature and humidity, the change in tension, and the creep, can be decreased as a whole. In addition, even when the track density in the tape width direction is very high, and the maximum permissible amount of the change in dimension of the tape itself is small, a magnetic tape medium having stable recording and reproducing properties and rarely having a off-track problem can be obtained.

EXAMPLES

Hereinafter, the present invention will be described in more detail with reference to examples.

Example 1

First, on two surfaces of a poly(ethylene terephthalate) (PET) film, Cu films were deposited by vacuum deposition to have a thickness of 600 Å (60 nm), so that the non-magnetic substrate was formed as described below.

[Non-Magnetic Substrate]
PET film (thickness: 6.0 μm, Young's modulus: longitudinal direction (MD)/width direction (TD)=650/500 kg/mm$^2$)
Cu film (thickness: 600 Å (60 nm))

Next, dispersion compositions for forming the magnetic layer, non-magnetic interlayer, and the back layer were prepared according to the following compositions.

[Magnetic Dispersion]

[Magnetic Powder]
Iron-cobalt alloy-based metal ferromagnetic powder (average long axis length: 0.1 µm)/100 parts by weight

[Binder]
Polyester-based polyurethane resin (weight average molecular weight: 41,200)/8 parts by weight
Poly(vinyl chloride)-based copolymer (average degree of polymerization: 350)/10 parts by weight

[Abrasive Material]
α-alumina (average grain diameter: 80 nm)/20 parts by weight

[Antistatic Agent]
Carbon black (average grain diameter: 20 nm)/3 parts by weight

[Lubricant]
Stearic acid/1 part by weight
Butyl stearate/2 parts by weight
Amide stearate /0.3 parts by weight

[Solvent]
Methyl ethyl ketone/20 parts by weight
Toluene/20 parts by weight
Cyclohexanone/10 parts by weight After those materials were compounded with each other using a kneader, followed by dilution using methyl ethyl ketone, toluene, and cyclohexanone, dispersing treatment was performed using a sand mill, and 4 parts by weight of polyisocyanate (curing agent sold under the trade name "Colonate L" manufactured by Nippon Polyurethane Industry Co., Ltd.) was then added and stirred, thereby forming a magnetic dispersion.

[Non-Magnetic Dispersion]

[Non-Magnetic Inorganic Powder]
Acicular-shaped α-iron oxide (average long axis length: 0.15 µm)/100 parts by weight
α-alumina (average grain diameter: 70 nm)/6 parts by weight

[Binder]
Polyester-based polyurethane resin (weight average molecular weight: 41,200)/8 parts by weight
Poly(vinyl chloride)-based copolymer (average degree of polymerization: 300)/8 parts by weight

[Antistatic Agent]
Carbon black (average grain diameter: 20 nm)/20 parts by weight

[Lubricant]
Stearic acid/1 part by weight
Butyl stearate/2 parts by weight

[Solvent]
Methyl ethyl ketone/70 parts by weight
Toluene/70 parts by weight
Cyclohexanone/40 parts by weight After those materials were compounded with each other using a kneader, followed by dilution using methyl ethyl ketone, toluene, and cyclohexanone, dispersing treatment was performed using a sand mill, and 3 parts by weight of polyisocyanate (curing agent sold under the trade name "Colonate L" manufactured by Nippon Polyurethane Industry Co., Ltd.) was then added and stirred, thereby forming a non-magnetic dispersion.

[Back Layer Dispersion]

[Inorganic Powder]
Carbon black (average grain diameter: 20 nm)/100 parts by weight
Carbon black (average grain diameter: 70 nm)/15 parts by weight
Plate-shaped α-iron oxide (average grain diameter: 0.9 µm, average thickness: 0.015 µm)/15 parts by weight
Titanium oxide (average grain diameter: 100 nm)/1 part by weight

[Binder]
Polyester-based polyurethane resin (weight average molecular weight: 71,200)/25 parts by weight
Nitrocellulose resin (average degree of polymerization: 90)/25 parts by weight

[Solvent]
Methyl ethyl ketone/200 parts by weight
Toluene/200 parts by weight
Cyclohexanone/50 parts by weight After those materials were compounded with each other using a kneader, dispersing treatment was performed using a sand mill, and 10 parts by weight of polyisocyanate (curing agent sold under the trade name "Colonate L" manufactured by Nippon Polyurethane Industry Co., Ltd.) was then added and stirred, thereby forming a back layer dispersion.

Next, on one surface of the non-magnetic substrate which was composed of the plastic film and the Cu films formed thereon by vacuum deposition, the non-magnetic dispersion and the magnetic dispersion were applied by die coating in that order so that the film thicknesses after drying were 1.4 µm and 0.1 µm, respectively. Subsequently, after magnetic field orientation and drying were performed, the film thus prepared was wound into a roll form. Next, after the back layer dispersion was applied onto the other side surface by die coating so that the film thickness after drying was 0.5 µm, drying was performed, and subsequently the film thus formed was wound into a roll form. Then, after calendaring and curing treatment were performed, slitting was performed to obtain a film having a width of ½ inches, and the film thus obtained was then wound to form a sample.

Example 2

A sample was obtained in the same manner as that in Example 1 except that a 5 µm-thick PET film having the same properties as described above was used as the plastic film forming the non-magnetic substrate.

Example 3

A sample was obtained in the same manner as that in Example 1 except that a 4.3 µm-thick PET film having the same properties as described above was used as the plastic film forming the non-magnetic substrate.

Example 4

A sample was obtained in the same manner as that in Example 1 except that a 4.3 µm-thick PET film having the same properties as described above was used as the plastic film forming the non-magnetic substrate, and that the film thickness of the non-magnetic interlayer after drying was set to 0.7 μm.

Example 5

A sample was obtained in the same manner as that in Example 1 except that the following poly(ethylene naphthalate) (PEN) film was used as the plastic film forming the non-magnetic substrate instead of the PET film.

[Non-Magnetic Substrate]
PEN film (thickness: 4.3 μm, Young's modulus: longitudinal direction (MD)/width direction (TD)=800/650 kg/mm$^2$)
Cu film (film thickness: 600 Å (60 nm))

Example 6

A sample was obtained in the same manner as that in Example 1 except that $Al_2O_3$ was used as the material for forming the films provided on the two surfaces of the plastic film forming the non-magnetic substrate.

Example 7

A sample was obtained in the same manner as that in Example 1 except that a 5.0 μm-thick PET film having the same properties as described above was used as the plastic film forming the non-magnetic substrate, and that $Al_2O_3$ was used as the material for forming the films provided on the two surfaces of the above PET film.

Example 8

A sample was obtained in the same manner as that in Example 1 except that $SiO_2$ was used as the material for forming the films provided on the two surfaces of the plastic film forming the non-magnetic substrate.

Comparative Example 1

A sample was obtained in the same manner as that in Example 1 except that the films formed of the aforementioned material were not provided on the two surfaces of the plastic film forming the non-magnetic substrate.

Comparative Example 2

A sample was obtained in the same manner as that in Example 1 except that a Cu film having a thickness of 600 Å (60 nm) was provided by vacuum deposition on only one surface of the plastic film forming the non-magnetic substrate at the side at which the back layer was formed.

Comparative Example 3

A sample was obtained in the same manner as that in Example 1 except that Al was used as the material for forming the films provided on the two surfaces of the plastic film forming the non-magnetic substrate.

Comparative Example 4

A sample was obtained in the same manner as that in Example 1 except that Ag was used as the material for forming the films provided on the two surfaces of the plastic film forming the non-magnetic substrate.

Comparative Example 5

A sample was obtained in the same manner as that in Example 1 except that Sn was used as the material for forming the films provided on the two surfaces of the plastic film forming the non-magnetic substrate.

Various properties of the films formed from the aforementioned materials and the magnetic tapes thus obtained in the examples and the comparative examples were measured as described below.

[Measurement of Young's Modulus]

The plastic film before provided with the films composed of the aforementioned material was cut into a test piece having a length of 100 mm and a width of 6 mm, and by using RSA-II manufactured by Rheometric Scientific Inc., the Young's modulus was measured. Subsequently, the non-magnetic substrate having the films formed of the aforementioned materials was cut into a test piece having the same size as described above, and the Young's modulus thereof was measured, and from the difference between the two values of the Young's modulus, the Young's modulus of the above material was obtained.

[Measurement of Coefficient of Thermal Expansion]

Thin films were prepared from the metals used in the examples and the comparative examples and were each cut into a test piece having a size of 10 mm by 20 mm. Next, by using a homemade device incorporating a laser scanning micrometer (LSM) manufactured by Keyence Corp., the test piece was placed in a chamber in which the environment could be controlled, and the change in dimension of the thin test piece was measured by changing the temperature from 10° C. to 45° C. at a constant humidity of 50% RH. The coefficient of thermal expansion was calculated by the following equation. Coefficient of Thermal Expansion=(Change in Width of Thin Test Piece/Initial Width of Thin Test Piece)/Change in Temperature

[Measurement of Amount of Change in Width Direction]

The change in dimension of the tape in the width direction caused by the environment factors such as the change in temperature and humidity, the change in tension, and the creep was measured as described below.

A sample having a length of 250 mm was used which was obtained by cutting a magnetic tape having a width of ½ inches. By using a homemade measurement device incorporating the laser scanning micrometer (LSM) manufactured by Keyence Corp., the sample set in the device was placed in a chamber in which the environment control can be performed, and the change in width was measured. First, while the sample is being applied with a tension of 0.6 N, environment conditions at 29° C. at 50% RH, 45° C. at 80% RH, 10° C. at 10% RH, and 29° C. at 50% RH were sequentially changed in that order for 15 hours, and subsequently, the tension applied to the sample in the longitudinal direction was change to 1.0 N, and the measurement of the change in width of the tape was performed under the same environment cycle conditions as described above. Then, the maximum amount of the change in width of the tape was obtained based on the smallest tape width.

[Measurement of Decrease in Output in the Same Drive]

A modified commercial available LTO drive was used as a measurement device. First, under a constant environment condition at 45° C. and 80% RH, recording was performed while a tension of 0.6 N was applied to the sample, and immediately after the recording, the output was reproduced under the condition described above and was used as the standard value. Subsequently, the environment condition was changed to that at 10° C. and 10% RH, and after a tension of 1 N was being applied to the sample for 30 hours, the output was again reproduced and was compared to the above standard value, thereby obtaining the decrease in output. In this measurement, the track density was 70 tracks/mm, the recording track width was 12 μm, and the reproducing track width was 6 μm, that is, the off-track margin A was 3 μm. A material for the magnetic head was AlTiC (coefficient of thermal expansion: $7.0 \times 10^{-6}/°C$.).

[Measurement of Decrease in Output in Different Drive]

By using the drive described above, in the same manner as described above, recording was performed under a constant environment condition at 45° C. and 80% RH while a tension of 0.6 N was applied to the sample, and immediately after the recording, the output was reproduced under the condition described above and was used as the standard value. Subsequently, by using a different device having the same specification as that of the above drive, after a tension of 1 N was being applied to the sample for 30 hours at a constant environment at 10° C. and 10% RH, the output was again reproduced and was compared to the above standard value, thereby obtaining the decrease in output. In this different drive, the gap of the reproducing heads was larger by 1.0 μm than that of the above drive.

The measurement results of the examples and the comparative examples are shown in Table 1 below.

In Comparative Examples 1 and 2 in which the films formed of the aforementioned material are not provided at all or the film is provided only on one side surface of the plastic film forming the non-magnetic substrate, in Comparative Examples 3 and 4 in which although the films are provided on the two surfaces, the coefficient of thermal expansion is not in the range defined in the embodiment according to the present invention, and in Comparative Example 5 in which although the films are provided on the two surfaces, the Young's modulus and the coefficient of thermal expansion are not in the range defined in the embodiment according to the present invention, the amount of change in dimension of the tape in the width direction is increased, and the decrease in output is large.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic tape medium having a thickness of 3.0 to 9.5 μm comprising:
    a non-magnetic substrate;
    a first film on an upper surface of said non-magnetic substrate;
    a second film on a lower surface of said non-magnetic substrate;
    at least one magnetic layer on said first film;
    a back layer below said second film; and

TABLE 1

| | Thickness of Magnetic Tape (μm) | Metal Material forming Film | Young's Modulus of Metal Material ($\times 10^3/mm^2$) | Coefficient of Thermal Expansion of Metal Material ($\times 10^{-6}/°C.$) | Amount of Change in Width Direction (ppm) | Decrease in Output (Same Drive) | Decrease in Output (Different Drive) |
|---|---|---|---|---|---|---|---|
| Example 1 | 8.0 | Cu | 13 | 16.5 | 910 | 0 | 0.6 |
| Example 2 | 7.0 | Cu | 13 | 16.5 | 946 | 0 | 0.7 |
| Example 3 | 6.3 | Cu | 13 | 16.5 | 964 | 0 | 0.8 |
| Example 4 | 5.6 | Cu | 13 | 16.5 | 982 | 0 | 0.9 |
| Example 5 | 6.3 | Cu | 13 | 16.5 | 933 | 0 | 0.7 |
| Example 6 | 8.0 | $Al_2O_3$ | 39 | 9 | 798 | 0 | 0.3 |
| Example 7 | 7.0 | $Al_2O_3$ | 39 | 9 | 807 | 0 | 0.4 |
| Example 8 | 8.0 | $SiO_2$ | 7 | 0.5 | 715 | 0 | 0.2 |
| Comparative Example 1 | 8.0 | None | | | 1,144 | 2.1 | 4.1 |
| Comparative Example 2 | 8.0 | Cu (one surface) | 13 | 16.5 | 1,018 | 0.9 | 2.5 |
| Comparative Example 3 | 8.0 | Al | 7 | 23 | 1,042 | 1.0 | 2.7 |
| Comparative Example 4 | 8.0 | Ag | 8 | 19 | 1,011 | 0.8 | 2.3 |
| Comparative Example 5 | 8.0 | Sn | 5 | 22 | 1,053 | 1.1 | 2.8 |

As shown in Table 1, superior results can be obtained in Examples 1 to 8 in which the films formed of the aforementioned material are provided on the two surfaces of the plastic film forming the non-magnetic substrate, and the Young's modulus and the coefficient of thermal expansion of the film formed of the aforementioned material are in the range defined in the embodiment according to the present invention. That is, the amount of change in dimension of the tape in the width direction caused by the environmental factors is sufficiently small, the decrease in output in the same drive does not occur, and the decrease in output in the different drive is small.

a servo signal recorded on at least one magnetic layer and the back layer for tracking control, wherein, said magnetic layer is a magnetic dispersion compound of a binder and a ferromagnetic powder dispersed therein having a thickness of 0.3 μm, said back layer is a dispersion composed of a binder and an inorganic pigment dispersed therein, the track density in the tape width direction is 50 tracks/mm or more, the off-track margin is 5 μm or less which is represented by one half of the difference between a recording track width and a reproducing track width, and the maximum permissible amount of change in dimension of the tape medium in the width direction caused by environment factors is 0.10% or less, said non-magnetic substrate includes a plastic film, said films are a material selected from the group consisting of a metal, a semi-metal, an alloy, an oxide, and a composite, said material having a Young's modulus of $7 \times 10^3$ kg/mm$^2$ or more and a coefficient of thermal expansion of $18 \times 10^{-6}$/° C. or less, and the oxide and the composite each being formed from one of the metal, the semi-metal, and the alloy.

2. The magnetic tape medium according to claim 1, wherein the films formed of the material each have a thickness of 10 nm or more.

3. The magnetic tape medium according to claim 1, wherein the plastic film has a Young's modulus of 500 kg/mm$^2$ or more in the longitudinal direction and a Young's modulus of 400 kg/mm$^2$ or more in the width direction.

4. The magnetic tape medium according to claim 1, wherein said first film has a thickness of 0.8 to 1.2 μm and said second has a thickness of 0.5 to 1.5 μm relative to the thickness of said first film.

* * * * *